US012561197B2

(12) United States Patent
Rao et al.

(10) Patent No.: US 12,561,197 B2
(45) Date of Patent: Feb. 24, 2026

(54) RECOVERING FROM AN ERROR DURING A CRYPTOGRAPHIC OPERATION RUNNING ASYNCHRONOUS TO A CORE PIPELINE

(71) Applicant: International Business Machines Corporation, Armonk, NY (US)

(72) Inventors: Rajat Rao, Bangalore (IN); Görkem Kilinç, Sindelfingen (DE); Gunturi Sandeep, Bangalore (IN); Deepankar Bhattacharjee, Bangalore (IN); Timothy Slegel, Staatsburg, NY (US); Soujanya S.R., Udupi (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 18/650,578

(22) Filed: Apr. 30, 2024

(65) Prior Publication Data

US 2025/0335290 A1 Oct. 30, 2025

(51) Int. Cl.
G06F 11/00 (2006.01)
G06F 11/07 (2006.01)
(52) U.S. Cl.
CPC ...... G06F 11/0793 (2013.01); G06F 11/0772 (2013.01)
(58) Field of Classification Search
CPC .......................... G06F 11/0772; G06F 11/0793
See application file for complete search history.

(56) References Cited

U.S. PATENT DOCUMENTS

| | | | | |
|---|---|---|---|---|
| 3,814,922 | A * | 6/1974 | Nibby | G06F 11/1048 |
| | | | | 714/E11.049 |
| 5,319,705 | A * | 6/1994 | Halter | H04L 9/0894 |
| | | | | 380/43 |
| 7,134,047 | B2 | 11/2006 | Quach | |
| 7,392,399 | B2 | 6/2008 | Grohoski et al. | |
| 8,429,738 | B1 | 4/2013 | Hughes et al. | |
| 8,515,059 | B2 | 8/2013 | Engels et al. | |
| 9,361,116 | B2 | 6/2016 | Ben-Kiki et al. | |
| 11,593,208 | B1 | 2/2023 | Gomes | |
| 2010/0128874 | A1* | 5/2010 | Scott-Nash | H04L 9/14 |
| | | | | 380/255 |
| 2011/0286596 | A1* | 11/2011 | Gressel | H04L 9/3236 |
| | | | | 380/268 |
| 2012/0030421 | A1 | 2/2012 | Chang et al. | |
| 2020/0403779 | A1* | 12/2020 | Gopal | G06F 11/1044 |
| 2021/0124711 | A1* | 4/2021 | Ansari | G06F 21/575 |
| 2021/0390024 | A1* | 12/2021 | Durham | G06F 21/79 |
| 2022/0224531 | A1* | 7/2022 | Farrell | H04L 9/3242 |

* cited by examiner

*Primary Examiner* — Joshua P Lottich
(74) *Attorney, Agent, or Firm* — CANTOR COLBURN LLP; Edward Wixted

(57) ABSTRACT

Examples described herein provide a computer-implemented method that includes performing, using a cryptographic accelerator, a cryptographic operation asynchronously relative to a core pipeline. The method further includes computing a chaining value for the cryptographic operation. The method further includes, responsive to an occurrence of an error, recovering from the error using the chaining value.

20 Claims, 13 Drawing Sheets

100

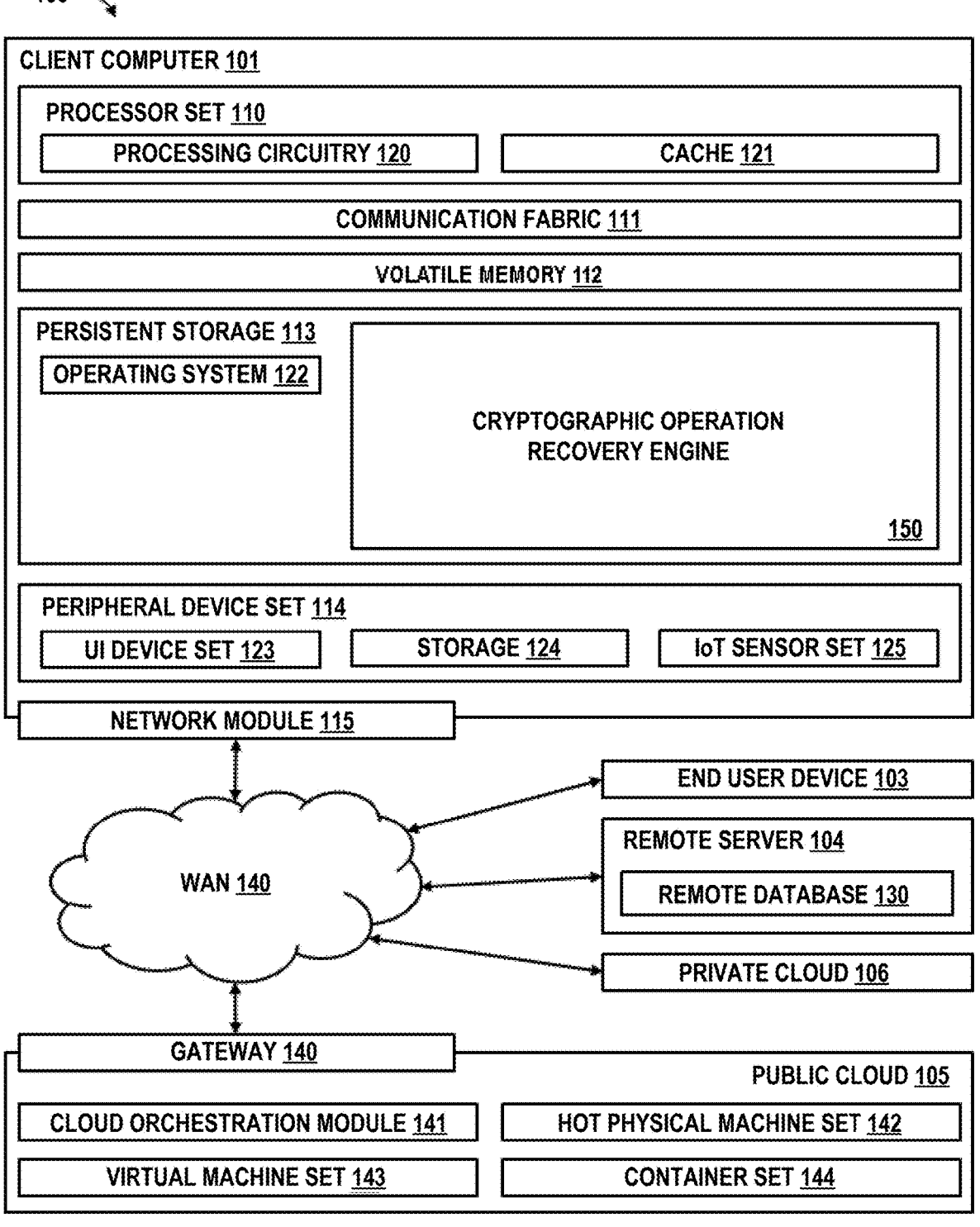

CLIENT COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

CRYPTOGRAPHIC OPERATION
RECOVERY ENGINE

150

PERIPHERAL DEVICE SET 114

UI DEVICE SET 123        STORAGE 124        IoT SENSOR SET 125

NETWORK MODULE 115

WAN 140

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOT PHYSICAL MACHINE SET 142

VIRTUAL MACHINE SET 143        CONTAINER SET 144

*FIG. 1*

420
FIG. 4C

422

440

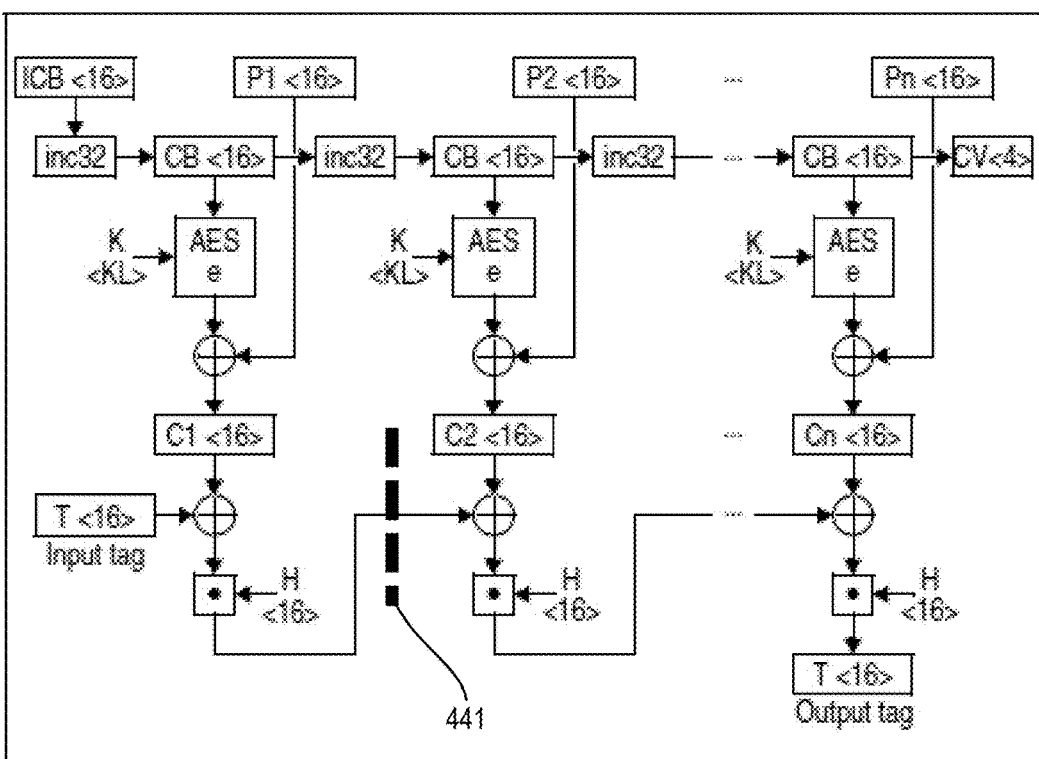

| Symbol | Explanation |
|--------|-------------|
| <n> | Length of item in bytes |
| CB | Counter block formed from the concatenation of the leftmost 12 bytes of $J_0$ with the incremented counter value (CV) |
| Cn | Block n of the ciphertext (first operand). |
| CV | Counter value stored into the parameter block. |
| H | Hash subkey. |
| ICB | Initial counter block comprising the leftmost 12 bytes of the initial-counter value ($J_0$) concatenated with the 4-byte counter value (CV). |
| inc32 | Incrementing of the 32-bit counter value (CV); a carry out of the leftmost bit position is ignored. |
| K | Key value. |
| KL | Key length (see Figure 7-80). |
| Pn | Block n of the plaintext (second operand). |
| T | Message-authentication tag (in the parameter block). |

*FIG. 4G*

Millicode actions for handling recovery events during cryptographic operations

| SPR005 bits | | | MCRD0. 39:51,53 | Storing Action | AES Chaining Value | DES Chaining Value |
|---|---|---|---|---|---|---|
| 0 | 8:23 | 45:63 | | | | |
| 0 | Zero | X | Zero, Zero | Restart the unit-of-operation | None | None |
| 1 | Zero | X | Non-zero but not equal to the target length, Zero | None needed | Obtain chaining value from SPR009/SPR009 | Obtain chaining value from SPR009 |
| 0 | Zero | End of target address | Target length, 1 | None needed | Obtain chaining value from SPR008/SPR009 | Obtain chaining value from SPR009 |
| 1 | Non-zero | Crypto-boundary aligned | X | None needed | Obtain chaining value from SPR008/SPR009 | Obtain chaining value from SPR00A |
| 1 | Non-zero | Not crypto-boundary aligned | X | Complete the store to the crypto boundary | If <= 8 bytes stored, obtain chaining value from SPR009/SPR00A, otherwise, obtain chaining value from SPR00A/SPR00B | Obtain chaining value from SPR00A |

RECOVERING FROM AN ERROR DURING A CRYPTOGRAPHIC OPERATION RUNNING ASYNCHRONOUS TO A CORE PIPELINE

BACKGROUND

The present disclosure relates to computing systems, and more specifically, to recovering from an error during a cryptographic operation running asynchronous to a core pipeline.

Some computing systems, like z/Architecture-based computing systems from International Business Machines, provide private, secure, and resilient hybrid multicloud computing capabilities. z/Architecture-based computing systems use a specialized instruction set architecture that offers advanced features, such as extensive memory addressing, support for vector and scalar processing, and specialized instructions for tasks like cryptographic operations.

Cryptographic operations refer to various tasks related to encryption, decryption, and cryptographic key management. These operations are used to provide data security and integrity in enterprise computing environments. They include algorithms such as Advanced Encryption Standard (AES), Rivest-Shamir-Adleman (RSA), and Secure Hash Algorithm (SHA), which are used for data protection, digital signatures, and secure communication. Specialized instructions and hardware acceleration can be used for executing these cryptographic operations efficiently and securely.

SUMMARY

In one embodiment, a method is provided. The method includes performing, using a cryptographic accelerator, a cryptographic operation asynchronously relative to a core pipeline. The method further includes computing a chaining value for the cryptographic operation. The method further includes, responsive to an occurrence of an error, recovering from the error using the chaining value.

In another embodiment, a system is provided. The system includes a memory having computer readable instructions and a processing device for executing the computer readable instructions. The computer readable instructions control the processing device to perform operations. The operations include performing, using a cryptographic accelerator, a cryptographic operation asynchronously relative to a core pipeline. The operations further include computing a chaining value for the cryptographic operation. The operations further include, responsive to an occurrence of an error, recovering from the error using the chaining value.

In yet another embodiment, a computer program product is provided. The computer program product includes a set of one or more computer-readable storage media and program instructions. The program instructions are collectively stored in the set of one or more storage media and cause a processor set to perform the computer operations. The operations include performing, using a cryptographic accelerator, a cryptographic operation asynchronously relative to a core pipeline. The operations further include computing a chaining value for the cryptographic operation. The operations further include, responsive to an occurrence of an error, recovering from the error using the chaining value.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

FIG. 1 illustrates a computing environment, according to an embodiment;

FIGS. 4A-4C and 4G illustrate block diagrams of performing an encipher operation that generates a chaining value;

FIG. 6 illustrates a table for millicode actions for handling events during cryptographic operations, according to an embodiment.

Figure 2:
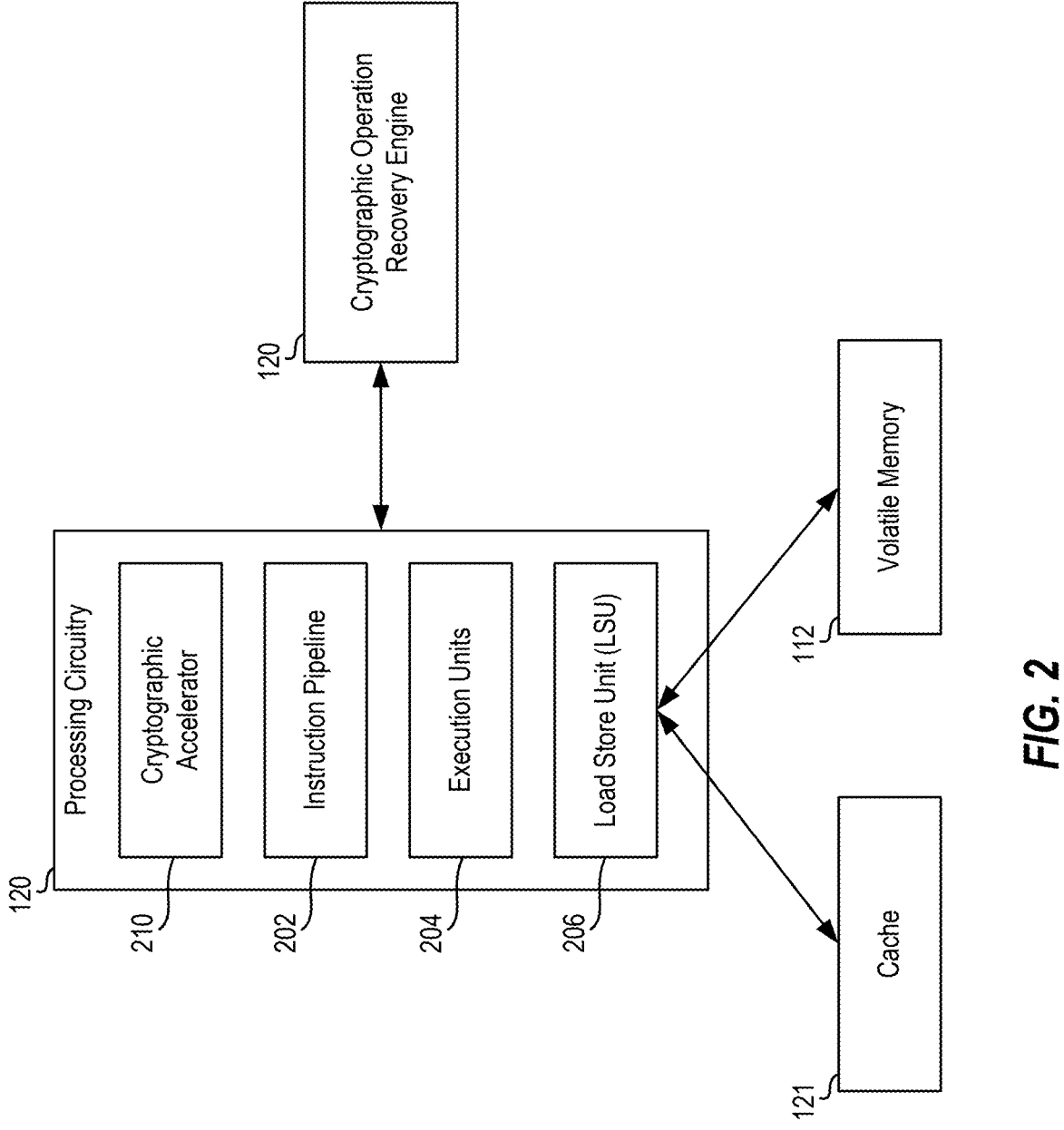
FIG. 2 illustrates the processing circuitry and the cryptographic operation recovery engine of the computing environment of FIG. 1, according to an embodiment.

The detailed description explains embodiments of the disclosure, together with advantages and features, by way of example with reference to the drawings.

DETAILED DESCRIPTION

One or more embodiments described herein provide for recovering from an error during a cryptographic operation running asynchronous to a core pipeline in a computing system, such as a z/Architecture-based computing system.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a cryptographic operation recovery engine 150 that includes a clock steering engine 152. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates the processing circuitry 120 and the cryptographic operation recovery engine 150 of the computing environment 100 of FIG. 1, according to an embodiment. In the example of FIG. 2, the processing circuitry 120 provides for executing instructions. The processing circuitry 120 can be a central processing unit (CPU) or any other suitable processing device.

The processing circuitry 120 includes an instruction pipeline 202, execution units 204, and a load store unit (LSU) 206, which together execute a core pipeline. A core pipeline is a set of instructions to be executed. While executing the instructions, data can be loaded from and/or stored to one or more memories (e.g., the volatile memory 112, the cache 121, and/or the like, including combinations and/or multiples thereof). The instruction pipeline 202 provides for fetching instructions, decoding the instructions, and executing the instructions (e.g., sequentially executing the instructions). The execution units 204 perform arithmetic, logical, and other operations specified by the instructions from the instruction pipeline 202. The LSU 206 sits between the execution units 204 and one or more memories, such as the cache 121 and the volatile memory 112. The LSU 206 handles load and store instruction, fetching data from one or more memories and/or writing data to one or more memories. It should be appreciated that one or more memories can be used in different embodiments. A memory (e.g., the cache 121) can have multiple levels of cache memory (e.g., L1, L2, etc.) to reduce latency of memory accesses. The LSU 206 can interact with the cache 121 and/or the volatile memory 112 to fetch data and/or store data.

The processing circuitry 120 also includes a cryptographic accelerator, which may be a synchronous accelerator that is part of the instruction pipeline 202 or may be an asynchronous co-processor. The latter configuration is shown in FIG. 2, where the cryptographic accelerator 210 represents an asynchronous co-processor (CoP). Asynchronous CoPs provide for processing relatively large blocks faster than synchronous accelerators because the asynchronous CoPs do not have instruction sequencing and execution overheads as these are handled by the instruction pipeline 202. However, using asynchronous CoPs means that the processing circuitry 120 is not able to resume operation in case an error causes an abrupt termination. Error recovery is useful for providing high-reliability of computing systems, like z/Architecture-based computing systems from International Business Machines.

Several issues exist relating to recovering from errors when an asynchronous cryptographic accelerator is used. For example, when an error causes an abrupt termination, input and output addresses may overlap; in such cases, the cryptographic accelerator 210 cannot restart operation. State information accompanies AES ciphers and triple data encryption standard (3DES) ciphers and needs to be correctly recovered in order for the cryptographic accelerator 210 to resume operation. In this case, the cryptographic accelerator 210 is running ahead and has already modified the state information by the time the error is detected. When an error causes an abrupt termination, the cryptographic accelerator 210 and cache 121 are not in synchronization because the source processed enters an output buffer first. The amount of data processed by the cryptographic accelerator 210 may be more than the amount of data committed into cache 121. Additionally, cache line crossings may store partial cipher blocks, which need to recover partial blocks correctly. If the store does not happen aligned to the cipher block size (e.g., 16-bytes for AES), then the un-stored data needs to be recovered. Further, multi-threaded operations map to a single CoP hardware. In such cases, the need exists to identify thread information correctly. Interleaved thread processing could mean that the data in the cryptographic accelerator 210 and the cache 121 could correspond to two different threads.

Figure 3:
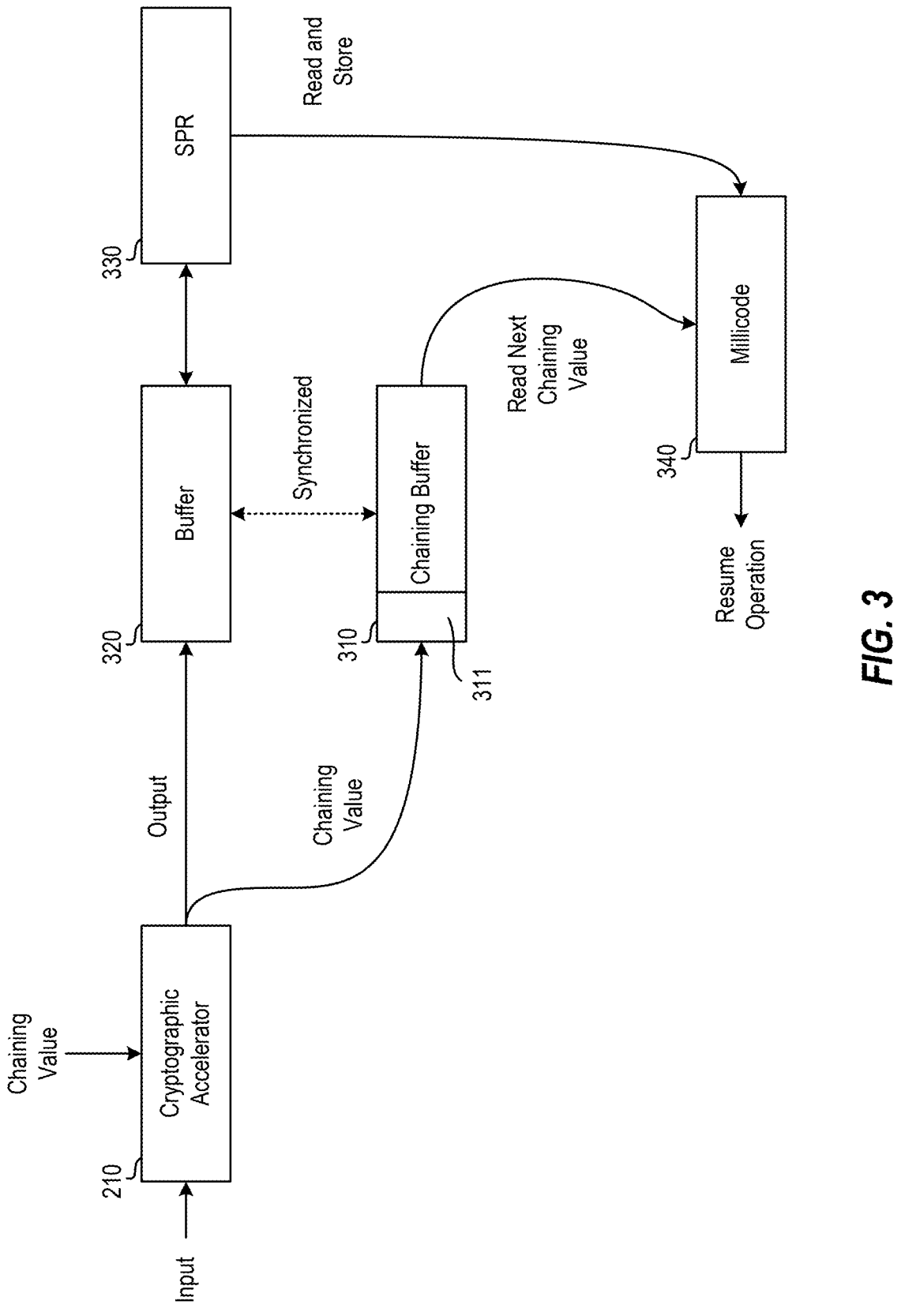
FIG. 3 illustrates a flow diagram of a method for recovering from an error during a cryptographic operation running asynchronous to a core pipeline, according to an embodiment.

To address these and other shortcomings, one or more embodiments described herein provides for recovering from an error during a cryptographic operation running asynchronous to a core pipeline. More particularly, with reference to FIGS. 1 and 2, the cryptographic operation recovery engine 150 provides for recovering from an error during a cryptographic operation running asynchronous to a core pipeline. Further details of the operation of the cryptographic operation recovery engine 150 are now described with reference to FIG. 3, which depicts a flow diagram of a recovery process 300 for the cryptographic accelerator 210, according to an embodiment.

To provide for error recovery in such cases, the cryptographic operation recovery engine 150 instantiates an array referred to as a "chaining buffer" (CB) 310 in the cryptographic accelerator 210. The cryptographic accelerator 210 receives an input (e.g., an instruction, data, etc.) and a chaining value, which is further described herein. The cryptographic accelerator 210 performs a cryptographic operation, such as AES, using the input and chaining value, and generates an output, which is stored in a buffer 320. According to one or more embodiments, the buffer 320 can be a buffer in the cache 121. The buffer 320 can be double word aligned in one or more embodiments. The LSU 206 can read data out of the buffer 320.

The chaining buffer 310 also generates a chaining value for the corresponding output value in the buffer 320. The chaining value is stored in the chaining buffer 310, which is synchronized with the buffer 320. The chaining buffer 310 stores the chaining value as numerical entries. The block 311 of the chaining buffer 310 stores a pointer to the youngest block count of the youngest chaining value. A special register (SPR) 330 is added in the LSU 206 to provide for verifying that quad word-aligned store information is present. According to one or more embodiments, multiple special registers (SPRs) can be implemented. Thus, the SPR 330 can represent one or multiple SPRs. The SPR 330 provides temporary storage for quad word alignment partially store data and addresses.

If a store is in progress when recovery begins (e.g. if the cryptographic accelerator 210 is storing information to the buffer 320 when an error occurs and recovery initiates), millicode 340 drains two partial-store special registers (e.g., SPR 330) to complete a quad word store. The millicode 340 can be used to implement part of an instruction set of a computer, such as the computing environment 100. The cryptographic accelerator 210 then queries the next chaining value stored in the chaining buffer 310 (e.g., from the block 311) and resumes operation, completing the recovery from the error.

According to one or more embodiments, the functioning of the computing environment 100 is improved by providing error recovery for the cryptographic accelerator 210. More particularly, by implementing the error recovery techniques described herein, the cryptographic accelerator 210 can recover from errors when operating asynchronously to the core pipeline. One or more embodiments provides a recovery scheme that enables recovery for cryptographic accelerators that overwrite the source memory. One or more embodiments provide a correlation between firmware running on multiple processing threads accessing a common cryptographic accelerator by capturing cryptographic accelerator state information and using that information to determine the progress made on each thread. One or more of these embodiments reduces system downtime, improves reliability, and/or the like, including combinations and/or multiples thereof.

The cryptographic accelerator 210 can perform cryptographic operations for different cryptographic standards. Non-limiting examples of cryptograph standards include: XOR-encrypt-XOR (XEX)-based tweaked codebook mode with cyphertext stealing (XTS), output feedback (OFB), cypher feedback (CFB), cipher block chaining (CBC), Galois/counter mode (GCM), and/or the like, including combinations and/or multiples thereof.

Figure 4A:

Examples of computing the chaining value for different types of cryptographic standards are now described with reference to FIGS. 4A-4E. FIG. 4A depicts a block diagram of performing an encipher operation 400 that generates an XTS chaining value at 401. For XTS encryption/decryption, as shown in FIG. 4A, the chaining value 401 is an XTS parameter after Galois Field GF(2) multiplication. For six cycles, six values are generated, according to one or more embodiments.

Figure 4B:
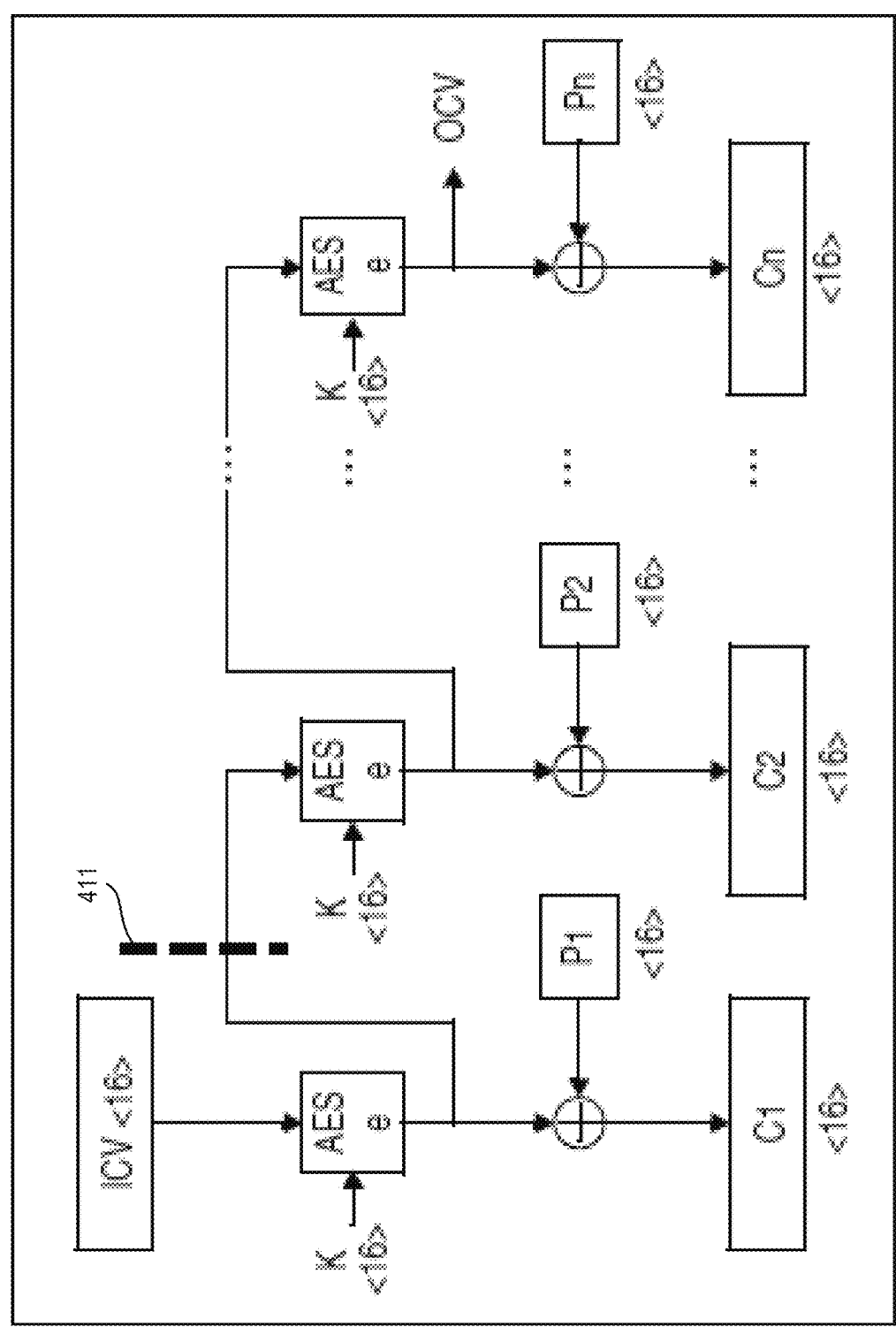

FIG. 4B depicts a block diagram of performing an encipher operation 410 that generates an OFB chaining value 411. For OFB encryption/decryption, as shown in FIG. 4B, the chaining value 411 is a function of the previous chaining value (e.g., AES_encrypt (previous chaining value)). For OFB, the operation is non-pipelining. The chaining value for the next block is sent out to be written to the chaining buffer 310, and the chaining value is written out at the end of the AES rounds.

Figure 4D:
FIGS. 4D-4F illustrate block diagrams of performing a decipher operation that generates a chaining value.

FIG. 4C depicts a block diagram of performing an encipher operation 420 that generates a CFB chaining value 421 for a CFB encrypt operation. FIG. 4D depicts a block diagram of performing an encipher operation 422 that generates a CFB chaining value 423 for a CFB decrypt operation. For CFB, the operations are non-pipelining. The chaining values 421, 423 for the next block are sent out to be written to the chaining buffer 310, and the chaining values 421, 423 are written out at the end of the AES round. For the CFB decrypt operation of FIG. 4D, 16 bytes of the chaining value 423 are stored with each round adding "s" bytes. The output for the buffer 320 is recovered by XORing with the ciphertext. According to one or more embodiments, unlike other instructions, CFB could hit an error recovery at a byte boundary instead of at an 8-byte or 16-byte boundary. Since AES itself operates only on 16-byte input/output, special handling is performed as follows. The value stored in the chaining buffer is first extracted and XOR'ed with up to "s" bytes of the ciphertext to retrieve the plain text that needs to be stored to reach alignment with the output block. Then, 16 bytes from the chaining buffer and 16 bytes of the plaintext are read and XOR'ed together to obtain the chaining value that is then used for the next block of operation. Additionally or alternatively, if the amount stored is less than 16 bytes, then whatever is stored is used for the right-most bytes and the remaining information (left-most bytes) for chaining is retrieved from the input chaining value that the instruction was invoked with.

Figure 4E:
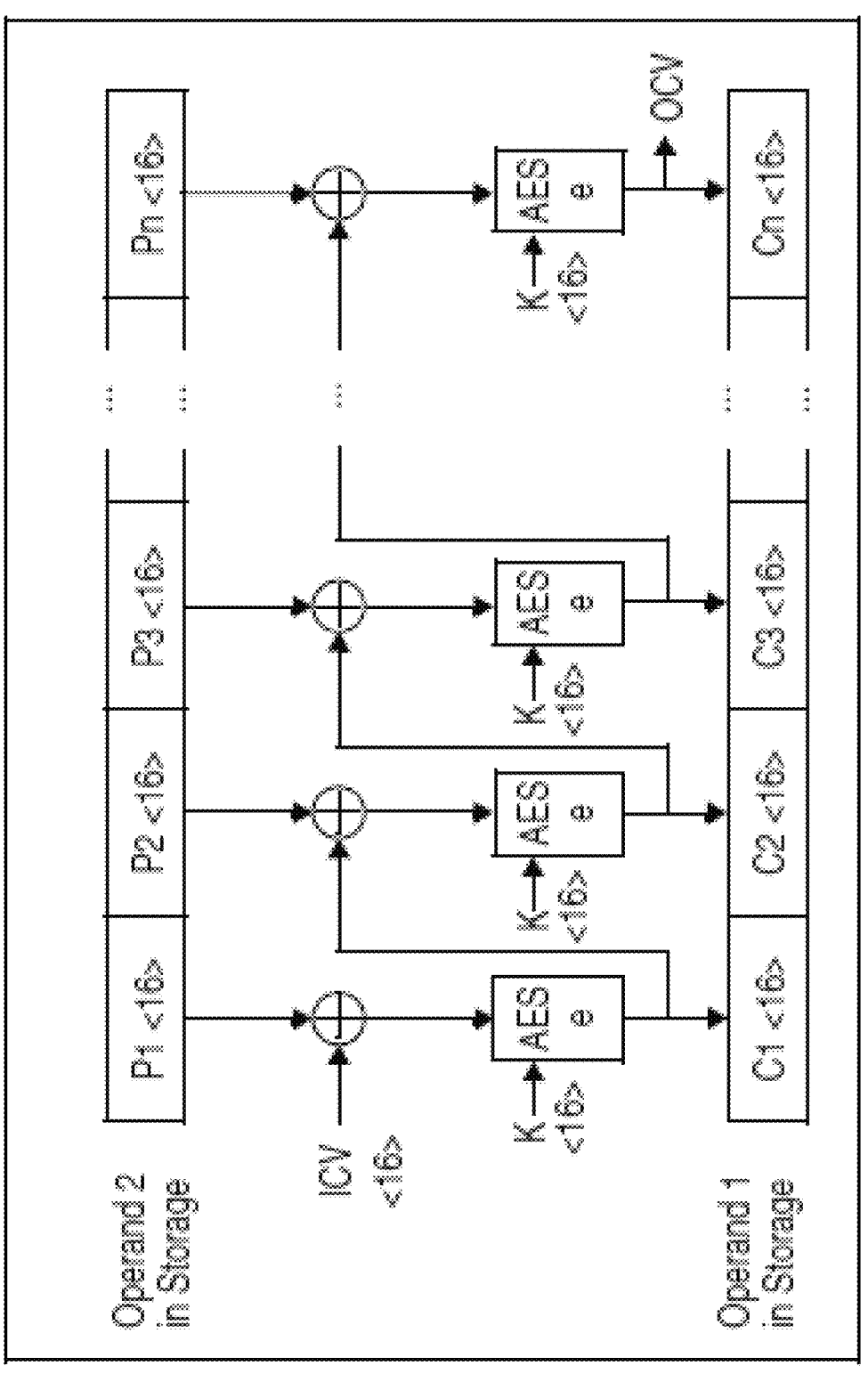
Figure 4F:
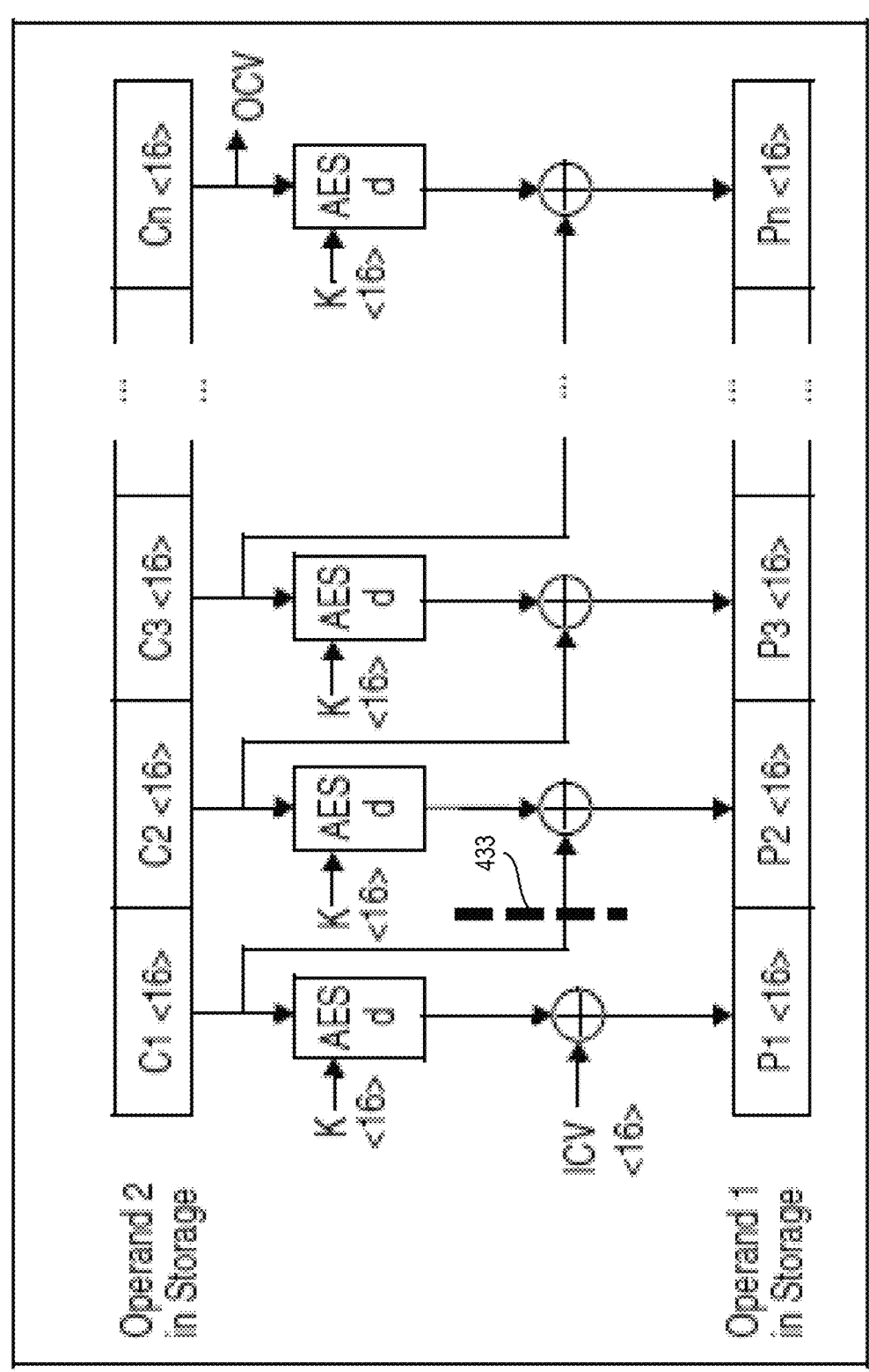

FIG. 4E depicts a block diagram of performing an encipher operation 430 that generates a CBC chaining value 431 for a CBC encrypt operation. The CBC encrypt operation is non-pipelining. The chaining value 431 for the next block is sent out to be written to the chaining buffer 310, and the chaining value is written to the chaining buffer 310. The chaining value 431 is not stored in some embodiments because the unwritten block output is the chaining value. FIG. 4F depicts a block diagram of performing an encipher operation 432 that generates a CBC chaining value 433 for a CBC decrypt operation. In this example, the chaining value 433 is the previous input ciphertext.

FIG. 4G depicts a block diagram of performing an encipher operation 440 that generates a GCM chaining value 441 for a GCM operation. In this example, the output of the GHASH is stored, and a counter block in AES-GCM operation can be computed using the millicode 340 based on how much data has been processed.

Figure 5:
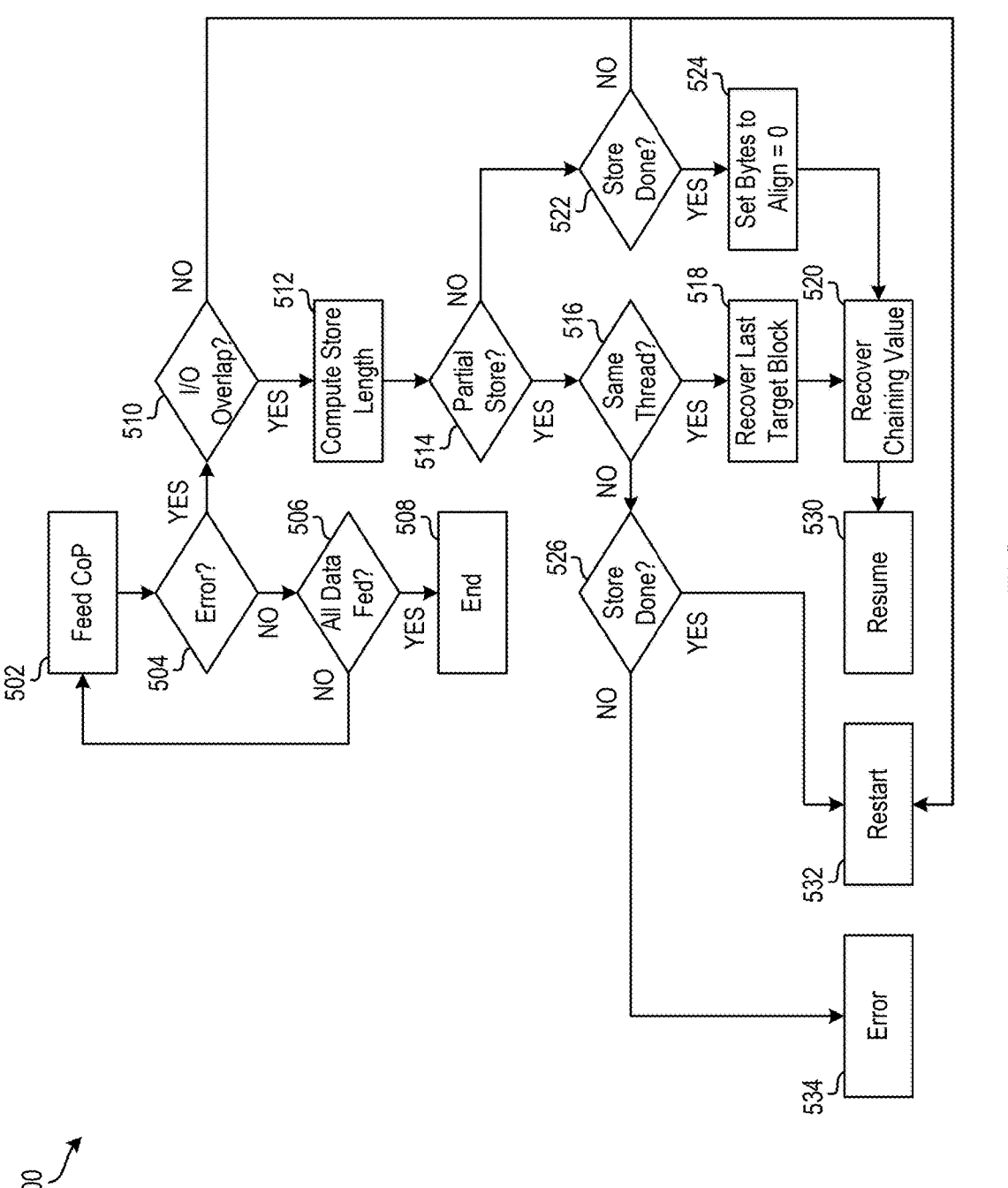
FIG. 5 illustrates a flow diagram of a method for recovering from an error during a cryptographic operation running asynchronous to a core pipeline, according to an embodiment.

Turning now to FIG. 5, a flow diagram of a method 500 for recovering from an error during a cryptographic operation running asynchronous to a core pipeline is depicted, according to an embodiment. The method 500 can be performed by any suitable computing system, device, or environment, such as those described herein.

The method 500 begins executing a cryptographic operation at block 502 with the cryptographic accelerator 210 being fed data to execute the cryptographic operation separate from the core pipeline. The core pipeline can continue executing other instructions asynchronously from the cryptographic accelerator 210. At block 504, it is determined whether an error has occurred (e.g., a software failure, a hardware failure, and/or the like, including combinations and/or multiples thereof). If not (block 504 "NO"), it is determined whether all data has been fed to the cryptographic accelerator 210, and if not (block 506 "NO"), the data continues to be fed at block 502. Once all data has been fed (block 506 "YES") the method 500 terminates at block 508. This represents a non-error cycle for the operation of the cryptographic accelerator 210.

When an error is detected (block 504 "YES"), the method 500 attempts to recover the cryptographic accelerator 210. At block 510, it is determined whether an input/output (I/O) overlap exists. An I/O overlap exists where input and output addresses overlap (e.g., the source and target addresses match). If no I/O overlap exists (block 510 "NO"), the method 500 proceeds to block 532, where the cryptographic accelerator 210 is restarted. If no I/O overlap exists (block 510 "YES"), the method 500 proceeds to block 512 where a compute store length is computed. It is then determined at block 514 whether a partial store was performed by comparing the computed store length to a known/expected value. A partial store is where data is stored in part but not completely. If not (block 514 "NO"), the method 500 proceeds to block 522 to determine whether the store was completed. If the store was not completed (block 522 "NO"), the method 500 proceeds to block 532, where the cryptographic accelerator 210 is restarted. However, if the store was completed (block 522 "YES"), the method 500 proceeds to block 524 where bytes are set to align=0. The chaining value is then recovered at block 520, and the cryptographic accelerator 210 can resume successfully at block 530. That is, the cryptographic accelerator 210 is able to recover from the error (block 504).

If, at block 514, it is determined that a partial store was performed (block 514 "YES"), the method 500 proceeds to block 516 where it is determined whether the partial store was performed on the same thread, where multiple threads are used. For example, the processing circuitry 120 can use the multiple hardware threads for performing operations concurrently (e.g., in parallel). If it is determined that the same thread was not used (block 516 "NO"), the method 500 proceeds to block 526, where it is determined whether the store was completed. If the store was not completed (block 526 "NO"), an error is deemed to have occurred that cannot be recovered, and thus the method 500 returns an error at block 534. However, if the store was completed (block 526 "YES"), the method 500 proceeds to block 532, where the cryptographic accelerator 210 is restarted.

If it is determined at block 516 that the same thread was used (block 516 "YES"), the method 500 proceeds to block 518, where a last target block is recovered. The chaining value is then recovered at block 520, and the cryptographic accelerator 210 can resume successfully at block 530. That is, the cryptographic accelerator 210 is able to recover from the error (block 504).

It should be appreciated that the blocks 510-526 can be performed by the cryptographic operations recovery engine 150.

Additional processes also may be included, and it should be understood that the processes depicted in FIG. 5 represent illustrations, and that other processes may be added or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Turning now to FIG. 6, a table 600 for millicode actions for handling events during cryptographic operations is shown, according to an embodiment.

After a core recovery event, for any reason and not just an error in the cryptographic accelerator 210 itself, the processing circuitry 120 could be in an inconsistent state where the cryptographic accelerator 210 stores from a cryptographic operation were not completed before the recovery event and also the chaining value will need to be updated. For the commonly used "in-place" operations ("in-place" refers to the source and target addresses matching), the source data will have been overwritten by partial target data. Therefore, the cryptographic accelerator 210 cannot be restarted from the beginning. Without special hardware mechanisms and millicode algorithms, the only option would be to present an instruction processing damage (IPD) machine check which is disruptive to software. In case the error is determined to be unrecoverable, this is the result. An example of an unrecoverable error specific to this disclosure is the lack of the state information to resume the operation from. An IPD machine check is triggered, which performs some diagnostics to check the hardware health, but from the software point-of-view the running thread is killed because it has reached an unrecoverable point and cannot continue. This is a disruption of service and adding recovery provides the benefit of providing a machine with higher reliability, availability, and serviceability. For crypto operations other than in-place, millicode 340 can safely restart the entire z/Architecture instruction from the beginning since the source data has not been destroyed. It should be appreciated that this approach can be used for other recovery events also. The mechanisms described herein work with the AES functions that have a 16-byte data block size and with the data encryption standard (DES) functions that have an 8-byte data block size. These mechanisms may not be needed for compression, modification, packing, substitution, compression (CMPSC), SORTL (a machine instruction used for sorting a list of data), and Unicode transformation format (UTF) convert-type instructions since in-place operations are not supported and therefore the entire z/Architecture instruction can be re-executed from the beginning. They may also not be needed for hashing functions since they do not overwrite source data. For operations other than AES and DES, millicode 340 can restart the cryptographic accelerator 210 at the beginning of the unit-of-operation.

The table 600 of FIG. 6 shows the actions millicode 340 can take to handle a core recovery event during an AES or DES operation in the cryptographic accelerator 210. First two special registers SPR005 and MCRD0 are read to determine the action to take. Based on the values of fields within these registers, it can be identified which row of the table applies to the state that the cryptographic accelerator 210 was in at the time of recovery. Then, in some cases, store bytes are obtained by reading special registers SPR006/SPR007 into storage. Finally, in some cases, the chaining value is read from the specified SPRs and stored into the parameter block for the instruction.

Regarding the table 600, the term "crypto-boundary" refers to the 8-byte block size for DES and the 16-byte block size for AES. For each row, at the completion of the millicode recovery algorithm, millicode 340 writes special register SPR005 to all zeros.

When storing from the chaining buffer 310 is performed (e.g., the last row of the table), millicode 340 reads the data from special registers SPR006 and SPR007. Based on the number of bytes remaining to be stored and the valid bits from SPR005.8:23, these bytes are stored at the address following that computed from the first operand program general register and the special register SPR005.45:63. The chaining values specified in the table 600 correspond to the crypto block after the stores from the prior step have been completed. If completing the stores happened to finish the crypto instruction completely, the chaining value is updated and end with CCO. Otherwise, after performing these steps, millicode 340 can either continue the cryptographic operation or can store the chaining value into the parameter block, update the program GRs, and end with CC3. If recovery occurs in the window after updating the parameter block and general purpose registers (GPRs) and before millicode routine end (MCEND), (e.g., after the branch on condition (BCR) serialized instruction 14,0 that confirms that the cryptographic accelerator 210 stores are complete), then recovery does not occur since millicode 340 does not retain an original copy of the parameter block and GPRs. Therefore, millicode 340 forces an IPD machine check during this window. During the AES-GCM instruction, there is a delay in hardware before storing the last two double words to complete the GHASH computation. If recovery occurs in this tiny interval, the last store will not have been stored; this can be detected by millicode 340 to see if special register MCRD0.39:51 is 1 to 7 bytes less than the expected. In this case millicode 340 forces an IPD machine check. This applies to the AES-GCM instruction according to one or more embodiments. During the AES-CFB instruction, special register SPR00C bits 0:39 also contain an additional 5 bytes of the chaining value.

In the table 600, SPR009 and SPR00A represent the chaining buffer 310. Special register SPR005 is used for the recovery scheme and stores the status for the state from the LSU 206. The special register MCRD0 is a status register storing the state from the cryptographic accelerator 210. With continued reference to FIG. 6, values 8:23 store whether an operation is in progress; values 45:63 store the last address committed into the cache 121, values 39:51 stores a zero or one, where zero indicates the operation is ongoing but not completed and one indicates the cryptographic accelerator 210 has completed its job and output its data; the value 53 is the amount of data written out.

Figure 7:
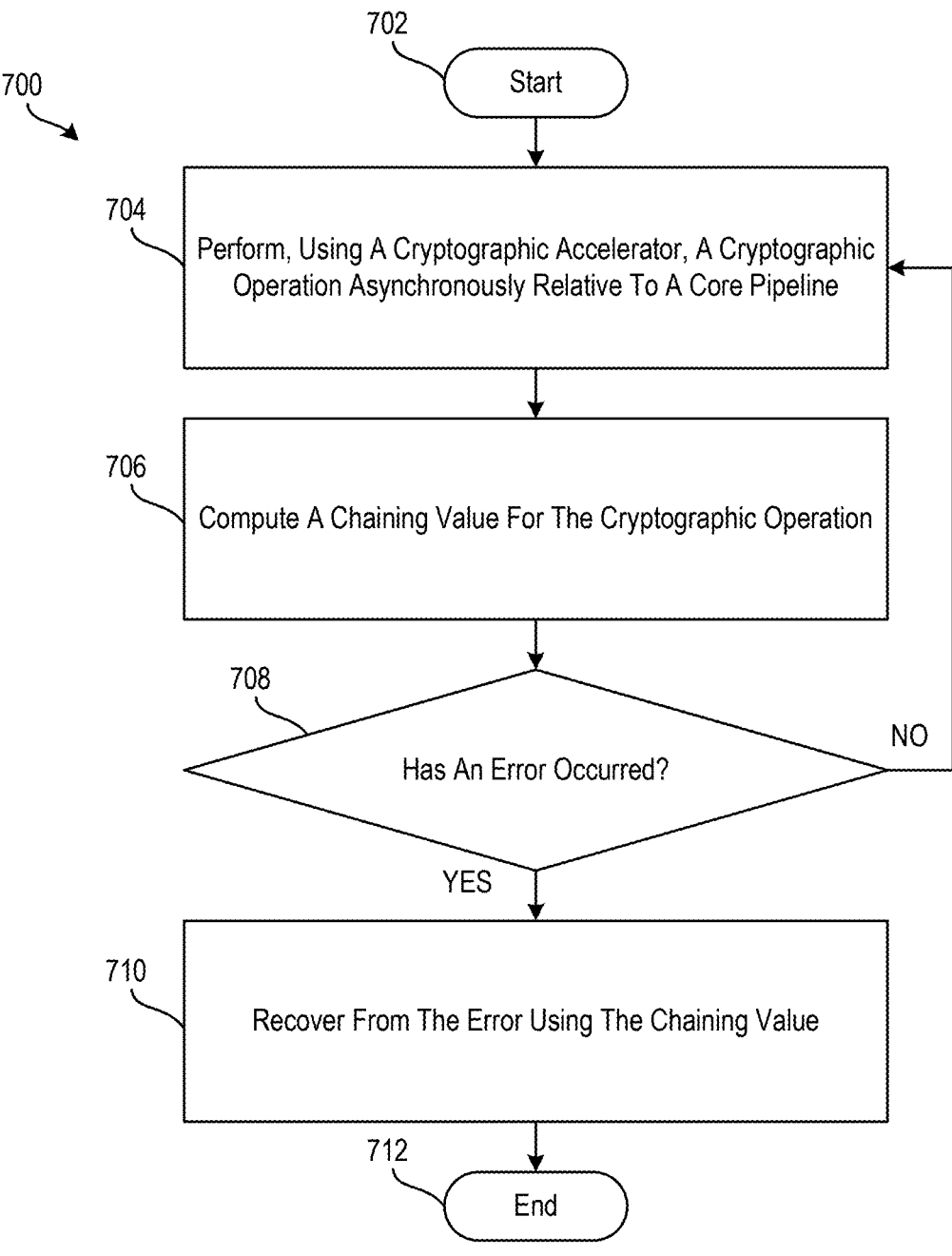
FIG. 7 illustrates a flow diagram of a method for recovering from an error during a cryptographic operation running asynchronous to a core pipeline, according to an embodiment.

Turning now to FIG. 7, a flow diagram of a method 700 for recovering from an error during a cryptographic operation running asynchronous to a core pipeline is depicted, according to an embodiment. The method 700 can be performed by any suitable computing system, device, or environment, such as those described herein.

The method 700 begins at block 702. At block 704, the cryptographic accelerator 210 performs a cryptographic operation (e.g., an AES operation). The cryptographic accelerator 210 operates asynchronously relative to a core pipeline as described herein. At block 706, the cryptographic operations recovery engine 150 computes a chaining value for the cryptographic operation. The chaining value can be stored in the chaining buffer 310, which is separate from a buffer that stores the output of the cryptographic accelerator 210. The chaining buffer 310 is synchronized with the buffer 320 that stores the output of the cryptographic accelerator 210.

At block 708, it is determined whether an error has occurred. For example, an error can be caused by a power outage, hardware failure, software failure, and/or the like, including combinations and/or multiples thereof. Responsive to detecting the occurrence of an error (block 708 "YES"), the method 700 proceeds to block 708. At block 708, the cryptographic operations recovery engine 150 uses the chaining value to cause the cryptographic accelerator 210 to recover from the error, as described regarding FIGS. 3 and 5, for example. Once recovery has been performed, the method 700 terminates at block 712. If no error is detected (block 708 "NO"), the method 700 can restart by returning to block 702.

Additional processes also may be included, and it should be understood that the processes depicted in FIG. 7 represent illustrations, and that other processes may be added or existing processes may be removed, modified, or rearranged without departing from the scope of the present disclosure. It should also be understood that the processes depicted in FIG. 7 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

One or more embodiments described herein provides for storing state information for ciphers tagged with a correlation to the cipher output in memory (e.g., the cache 121). One or more embodiments described herein provides for processing cipher block sizes and making available data for stores to memory (e.g., the cache 121) that were in progress when the error occurred. One or more embodiments described herein provides a scheme to identify the last successful memory (e.g., the cache 121) store of a cryptographic operation, to determine subsequent stores to complete a cipher block, and executing that store. One or more embodiments described herein provides for handling recovering state information from multiple hardware threads executing on the processing circuitry 120. One or more embodiments described herein provides for processing state information to complete block-aligned stores. One or more embodiments described herein provides for correlating the stored address with the state information and using the stored address to resume the operation after error recovery.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:
   performing, using a cryptographic accelerator, a cryptographic operation asynchronously relative to a core pipeline;
   computing a chaining value for the cryptographic operation; and
   responsive to an occurrence of an error, recovering from the error using the chaining value.

2. The computer-implemented method of claim 1, wherein the chaining value is stored in a chaining buffer.

3. The computer-implemented method of claim 2, further comprising storing an output of the cryptographic operation to a buffer separate from the chaining buffer.

4. The computer-implemented method of claim 3, wherein the buffer and the chaining buffer are synchronized.

5. The computer-implemented method of claim 1, wherein the cryptographic operation is one of an XOR-encrypt-XOR (XEX)-based tweaked codebook mode with cyphertext stealing (XTS) operation, an output feedback (OFB) operation, a cypher feedback (CFB) operation, a cipher block chaining (CBC) operation, or a Galois/counter mode (GCM) operation.

6. The computer-implemented method of claim 1, further comprising determining whether the error occurred.

7. The computer-implemented method of claim 1, wherein recovering from the error using the chaining value comprises:
   computing a store length;
   determining, using the store length, whether a partial store occurred; and
   responsive to the partial store having occurred, and responsive to a store being completed, setting bytes to align equal zero and recovering the chaining value.

8. The computer-implemented method of claim 1, wherein recovering from the error using the chaining value comprises:
   computing a store length;
   determining, using the store length, whether a partial store occurred; and
   responsive to the partial store having occurred, and responsive to a same thread being used, recovering a last target block and recovering the chaining value.

9. A system comprising:
   a memory comprising computer readable instructions; and

15

16 a processing device for executing the computer readable instructions, the computer readable instructions controlling the processing device to perform operations comprising:

performing, using a cryptographic accelerator, a cryptographic operation asynchronously relative to a core pipeline;

computing a chaining value for the cryptographic operation; and responsive to an occurrence of an error, recovering from the error using the chaining value.

10. The system of claim 9, wherein the chaining value is stored in a chaining buffer.

11. The system of claim 10, wherein the operations further comprise storing an output of the cryptographic operation to a buffer separate from the chaining buffer.

12. The system of claim 11, wherein the buffer and the chaining buffer are synchronized.

13. The system of claim 9, wherein the cryptographic operation is one of an XOR-encrypt-XOR (XEX)-based tweaked codebook mode with cyphertext stealing (XTS) operation, an output feedback (OFB) operation, a cypher feedback (CFB) operation, a cipher block chaining (CBC) operation, or a Galois/counter mode (GCM) operation.

14. The system of claim 9, wherein the operations further comprise determining whether the error occurred.

15. The system of claim 9, wherein recovering from the error using the chaining value comprises:

computing a store length;

determining, using the store length, whether a partial store occurred; and responsive to the partial store having occurred, and responsive to a store being completed, setting bytes to align equal zero and recovering the chaining value.

16. The system of claim 9, wherein recovering from the error using the chaining value comprises:

computing a store length;

determining, using the store length, whether a partial store occurred; and responsive to the partial store having occurred, and responsive to a same thread being used, recovering a last target block and recovering the chaining value.

17. A computer program product comprising:

a set of one or more non-transitory computer-readable storage media;

program instructions, collectively stored in the set of one or more storage media, for causing a processor set to perform the following computer operations:

performing, using a cryptographic accelerator, a cryptographic operation asynchronously relative to a core pipeline;

computing a chaining value for the cryptographic operation; and responsive to an occurrence of an error, recovering from the error using the chaining value.

18. The computer program product of claim 17, wherein the chaining value is stored in a chaining buffer.

19. The computer program product of claim 18, wherein the operations further comprise storing an output of the cryptographic operation to a buffer separate from the chaining buffer.

20. The computer program product of claim 19, wherein the buffer and the chaining buffer are synchronized.

* * * * *